United States Patent Office 3,480,379
Patented Nov. 25, 1969

3,480,379
TANNING OF LEATHER EMPLOYING SYNTHETIC ANIONIC TANNING AGENTS
Stanley A. Lipowski, Livingston, and James M. Kelly, Belford, N.J., assignors to Diamond Alkali Company, a corporation of Delaware
No Drawing. Original application Aug. 30, 1965, Ser. No. 483,832. Divided and this application May 31, 1968, Ser. No. 739,952
Int. Cl. C14c 3/20
U.S. Cl. 8—94.24     3 Claims

ABSTRACT OF THE DISCLOSURE

Processes for pretanning, tanning and retanning leather use an all purpose synthetic tanning agent, which is obtained by condensing formaldehyde and a phenol with a sulfonated condensate of formaldehyde and mixed phenols. The tanning agent is produced by condensing mixed phenols which are a mixture of phenol and lower alkyl phenols with formaldehyde, sulfonating the condensate and thereafter condensing the sulfonated condensate with formaldehyde and a phenol.

---

This application is a divisional application of Ser. No. 483,832, Lipowski et al., field Aug. 30, 1965.

The present invention relates to novel synthetic anionic tanning agents, their preparation and their utilization in the tanning of leather.

Sulfonated phenolic synthetic tanning agents were first developed by E. Stiasny. He developed two main types. The first was based upon the sulfonation of a phenol or cresol with sulfuric acid followed by condensation of the resulting sulfonate with formaldehyde. The second type was an improved one based upon formation of the phenolic resin from phenol, cresol and formaldehyde with solubilization of the resin accomplished by sulfonation. However, the action of those syntans on leather was very crude and hence they were practically abandoned in a short time. Subsequent work along these lines was carried out in Germany and published in numerous patents as well as in a very comprehensive review in the British Intelligence Report entitled "The Manufacture and Practical Application of German Synthetic Tanning Materials (HIOS Trip No. 1763). Many of the products mentioned in this report are still manufactured and marketed internationally. All of the above mentioned products are based on phenols, cresols and cresylic acids while a few of them contain resorcinol, naphthol, naphthalene, or lignosulfonates. The synthesis of these syntans is based on numerous combinations and modifications of these materials. Phenol and cresol-sulfones, phenol-cresol resins made with formaldehyde, phenol-urea-formaldehyde condensates, low and high sulfonated aromatic bases, naphthalene and naphthol derivatives are used as intermediates. In certain uses, omega-sulfonation (methyl sulfation) under pressure or under normal atmospheric conditions is used. The intermediates are mostly reacted together, but sometimes they are used as simple mixtures or dispersions.

However, none of these numerous products satisfactorily meet the high standards required by the leather industry today and their shortcomings are most apparent in the vegetable tanning of sole leathr. For example, when these known synthetic anionic tanning agents are used in blends with vegetable tannin extracts they neither brighten the color of the tanned leather nor give the leather a uniform appearance with respect to feel, color and the like. This is because they only partially disperse the insoluble phlobaphenes which are formed in the vegetable tannin liquors on standing and consequently do not give uniform color to the leather. Furthermore, none of the known synthetic anionic tanning agents are able to give uniform color, plumpness, fine and strong grain and high tensile strength to leather in a single tanning operation. For this reason the known synthetic anionic tanning agents have limited use in tanning sole leather. Likewise the known synthetic anionic tanning agents are not particularly suitable for use in light leather tannage or as retanning agents for chrome tanned upper leather. Furthermore, these synthetic agents lack the versatility of being useful in all types of tannage, e.g., in sole leather, belting leather, garment leather, glove leather and upper shoe leather tannage because of the above mentioned limitations. Thus the modern tanning industry has been seeking a universal tanning agent which can be used in all types of tannages and which can be used as a single tanning agent in mixtures with vegetable extracts and as a retan on mineral tannages.

Accordingly, it is an object of the present invention to provide for a tanning agent which can be universally employed in pretanning, tanning and retanning operations, either alone or in blends with vegetable tannins. It is a further object to provide for anionic synthetic tanning agents which brighten the color of the leather, bleach the leather, give the leather a uniform appearance and produce mellow light colored round and pliable leathers having high shrink temperatures, high tensile strengths and improved stitch tear strengths. Another object of the present invention is to provide for processes for producing synthetic anionic tanning agents having the foregoing properties. A further object is to provide for leather having the aforementioned properties. It is intended, however, that the detailed description and specific examples do not limit the invention but merely indicate preferred embodiments thereof since various changes and modifications within the scope of this invention will become apparent to those skilled in the art.

The above objects as well as other objects of this invention have been most unexpectedly and successfully achieved in the following manner. We have prepared and utilized in a variety of leather tanning operations, synthetic anionic tanning agents which can be broadly described as follows. These synthetic anionic tanning agents or syntans are condensates of (a) sulfonated condensates of certain hyroxy aromatic components with formaldehyde with (b) either phenol or additional quantities of the hydroxy aromatic component or mixtures thereof and formaldehyde. The sulfonated condensate (a) is the sulfonated condensate of one mole of the hydroxy aromatic component with from about 0.6 to 0.9 mole of formaldehyde per mole of the hydroxy aromatic component. The hydroxy aromatic component is a mixture of phenol and lower alkyl phenols which are methylphenols, ethylphenols and dimethylphenols. More specifically, each mole of the hydroxy aromatic component contains from about 0.5 to 0.8 mole of phenol, from about 0 to 0.15 mole of at least one substituted phenol which has reactive hydrogens in each of the 2-, 4- and 6-positions of the aromatic ring, from about 0.1 to 0.4 mole of at least one substituted phenol which has reactive hydrogen atoms in both the 4- and 6-positions of the aromatic ring or which has reactive hydrogen atoms in both the 2- and the 6-positions of the aromatic ring, and from about 0 to 0.05 mole of at least one substituted phenol which has a reactive hydrogen in the 4-position of the aromatic ring as the sole reactive hydrogen or which has a reactive hydrogen in the 6-position of the aromatic ring as the sole reactive hydrogen. The $SO_3$ content of this condensate is from 0.35 to 0.7 mole of $SO_3$ per mole of the hydroxy aromatic component. The (b) component of the syntan is composed of from about 0.1 to 0.5 mole of phenol per mole of the hydroxy aromatic component used initially in the sulfonated condensate (a) and from about 0.1 to 0.4 mole of formaldehyde per mole of the hydroxy aromatic component used initially. In place of phenol, the same hydroxy aromatic component which was used initially can be used here or a mixture of both.

The various methylphenols, ethylphenols and dimethylphenols which can be present with phenol in the hydroxy aromatic component are described in greater detail below. Formulas I and II, wherein R represents a methyl or ethyl radical, exemplify substituted phenols which have reactive hydrogen atoms in each of the 2-, 4- and 6-positions of the aromatic rings. Such phenols include 3-methylphenol (m-cresol), 3-ethylphenol, 3,5-dimethylphenol (sym-m-xylenol), 3,5-diethylphenol and the like.

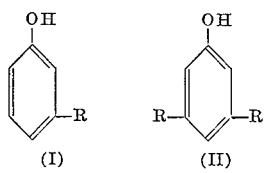

Formulas III–VII inclusive, wherein R represents a methyl or ethyl radical, exemplify substituted phenols which have reactive hydrogen atoms in both the 4- and 6-positions of the aromatic ring or which have reactive hydrogen in both the 2- and 6-positions of the aromatic ring.

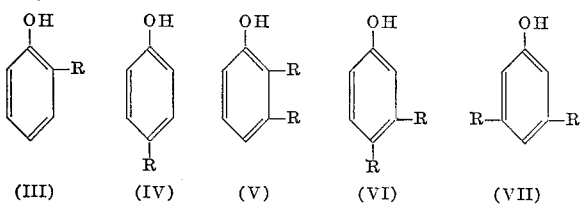

Such phenols include 2-methylphenol (O-cresol), 2-ethylphenol, 4-methylphenol (p-cresol), 4-ethylphenol, 2,3-dimethylphenol (vic-o-xylenol), 2,3-diethylphenol 3,4-dimethylphenol (uns-0-xylenol), 3,4-diethylphenol, 2,5-dimethylphenol (p-xylenol), 2,5-diethylphenol and the like.

Formulas VIII and IX, wherein R represents a methyl or ethyl radical, exemplify substituted phenols which have a reactive hydrogen in the 4-position of the aromatic ring as the sole reactive hydrogen or which have a reactive hydrogen in the 6-position of the aromatic ring as the sole reactive hydrogen atom. Such phenols include 2,4-dimethylphenol (uns-m-xylenol), 2,4-diethylphenol, 2,6-dimethylphenol (vic-m-xylenol), 2,6-diethylphenol and the like.

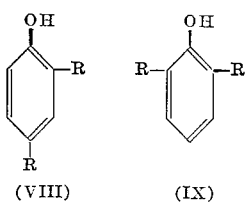

These phenols act as chain terminators and the amount of 2,6-dimethylphenol or 2,4-dimethylphenol, when used should not exceed a total of 0.05 mole per mole of the hydroxy aromatic component.

The foregoing syntans can be universally employed in pretanning and retanning operations, either alone or in blends with vegetable tannins. Further, leather treated with these syntans exhibits excellent properties, that is, lighter color, greater penetration of the syntan, improved lightfastness, mellow grain of leather, greater stitch strength, greater tensile strength, improved abrasion resistance and the like. It is believed that the outstanding results achieved by the syntans of the present invention are due to the unique combination of the components and their proportions.

The process for preparing the above described syntans is as follows. One mole of the hydroxy aromatic component is condensed with from about 0.6 to 0.9 mole of formaldehyde or formaldehyde liberating material at a temperature from about 80° to about 120° C. It is to be understood that if temperatures above 105° C. are used, superatmospheric pressures are used. This reaction is carried out for from about one to ten hours. The preferred temperature is from about 95° to 105° C. and the preferred time for the reaction is from about two to six hours. The resulting condensate of the hydroxy aromatic component with formaldehyde obtained from this condensation is then sulfonated for from about one to twelve hours at temperatures of from about 0° to 120° C. to obtain a sulfonated condensate having from about 0.35 to 0.70 mole of $SO_3$ per mole of the hydroxy aromatic component. When 98% sulfuric acid is used, the sulfonation is carried out at temperatures of from 70° to 80° C. over from two to five hours. The sulfonate obtained is then condensed with from 0.1 to 0.5 mole of additional hydroxy aromatic component or phenol or mixtures of both per mole of the hydroxy aromatic component used initially and from 0.1 to 0.4 mole of formaldehyde or a formaldehyde precursor per mole of the hydroxy aromatic component used initially. This condensation is carried out at temperatures of from about 20° C. to 70° C. over periods of time from about one to six hours. Usually this condensation is complete within from two to five hours if it is carried out at temperatures in the range of from 35° to 45° C. Alternatively, the sulfonated condensate can be diluted and cooled down to, e.g., 0° C., and the formaldehyde or its precursor added before the phenol, the hydroxy aromatic component or mixtures thereof. Should this order of addition be carried out, then the temperature must be raised again to 20° to 70° C. for the condensation to occur.

Formaldehyde or formaldehyde precursors, i.e. formaldehyde liberating materials, can be used in the two condensations. For example, formaldehyde can be used in the form of 10 to 40% aqueous solutions, 30 to 55% alcoholic solutions with alcohols such as methanol, n-butanol, i-butanol or the like. Formaldehyde can also be used in any of its polymeric forms such as paraformaldehyde, trioxane, hexamethylene tetramine or the like. It is also to be understood that formaldehyde may be used in any other form which is capable of producing formaldehyde such as acetals. In the addition of formaldehyde and its precursors, these materials can be introduced into the reaction system continuously or incrementally. It is only necessary to ensure that the reaction does not become violent and difficult to control because of its exothermic nature.

Examples of sulfonating agents which can be employed are 98% and 100% sulfuric acid, sodium acid sulfate, chlorosulfonic acid, sulfur trioxide, oleums containing from 20% to 65% sulfur trioxide and the like. If desired, sulfonation can be carried out in a solvent such as acetic anhydride, ethylene dichloride, monochlorobenzene, acetone and the like. When a solvent is employed, from 10% to 500% of solvent based on the weight of the hydroxy aromatic component can be used.

APPLICATIONS

The synthetic tanning agents disclosed in this invention give outstanding results when they are used as syntans in the treating, i.e., the pretanning, tanning and retanning of vegetable tanned and chrome tanned leathers. These syntans are used alone or in blends with vegetable tannin extracts depending on the requirements of the particular application in which they are employed. These syntans are also true replacement syntans. The amount of syntans used in the applications described below are based on the weight of leather used and expressed as the percent of the weight of the leather. Likewise the amount of vegetable tannins used in blends with these syntans are also based on the weight of leather used and expressed as the percent of the weight of leather. The percent of syntans employed in these applications may vary from 0.05% to 50% of solids based on the weight of leather and the percent of vegetable tannins employed in blends of syntans may vary from 0.1% to 100% of solids based on the weight of leather.

For example, when these syntans are used in blends with vegetable tannins in yard tannages in the production of vegetable tanned leathers, they improve the color of the leather, accelerate penetration of vegetable extracts into the leather and perform all of the functions of vegetable tannages. These tanning agents have outstanding bleaching properties when used on vegetable tanned leathers. For example, they impart light even colors when used on pickled stock. Furthermore, they inhibit sludge formation, fermentation and mold growth in the tanning process. Addition of these syntans to vegetable tannins prevents sludge buildup in rockers. Use of these syntans in regular yard blends provides more effective utilization of tanning liquors. The weight giving and filling portions of vegetable extracts which are of larger particle size and normally precipitate are kept in suspension so that they are absorbed by the hides and produce tanned leathers having extra weight and solidity. When these syntans are used in vegetable extract blends, they accelerate tannage and extract exhaustion and leave the grain clean and clear. Likewise the phenolic nature of these syntans provides antiseptic properties which inhibit fermentation and mold growth. Inhibition of fermentation and mold growth is particularly desirable because tannage losses are reduced and considerable savings are effected over extended periods of time. Leathers tanned with blends of these syntans and vegetable tannins also have less odor than leathers tanned with conventional tanning agents.

In yard tannage operations from 1.0% of solids to 10% of solids by weight of these synthetic tanning agents based on the weight of leather are normally employed at a pH of from 5.5 to 3.0 and are introduced at 60° F. to 100° F. from 8 to 24 days. Generally from 1.0% of solids to 10% of solids by weight of these syntans based on the weight of leather are used in blends with from 10% to 100% vegetable tannins based on the weight of leather.

When these syntans are used with vegetable blends in drumming operations, they exhibit excellent bleaching properties. They aid in penetration of the extract into the leather and disperse natural greases to give clean, clear well bleached leather without undertones. Furthermore, grain crack is eliminated because the grain is not overloaded with excess tannins. Usually in drumming operations from 1.0% of solids to 10% of solids by weight of the syntans based on the weight of leather in blends with from 5% of solids to 50% of solids by weight of vegetable tannins based on the weight of leather are introduced at a pH of from 4.5 to 3.0 at 60° F. to 120° F. over a period of from 4 to 72 hours.

Addition of these syntans as tanning agents for sole leather oil wheel loads results in improved grease and oil dispersion, better takeup of fillers, added weight in the leather and lighter colors. The syntans demonstrate their remarkable bleaching properties in this type of tannage. The syntans have excellent stability to the salts which are present in vegetable extracts. Their stability to these salts permit then to disperse the grease and oils which contributes to more uniform distribution of oil, salts and tanning agents in the leather and provides leathers which dry to very level shades. Here again, the antiseptic properties of these syntans which inhibit mold growth is an added advantage. Generally in sole leather oil wheel load tanning operations, from 0.05% of solids to 5% of solids by weight of these syntans based on the weight of leather are employed in blends with from 0.1% solids to 10.0% solids by weight of vegetable extracts based on the weight of leather at a pH of from 5.5 to 3.5 and the blends are introduced at from 60° F. to 120° F. over from 2 to 8 hours.

These syntans are also useful as retans on vegetable grains to provide leathers having improved grain appearance and flexibility. They improve grain strengths, eliminate grain cracking, brighten colors and eliminate undertones. When these syntans are used as retans on vegetable grains, from 0.05% solids to 2.5% solids by weight of the syntans based on the weight of leather are normally employed at a pH from 5.5 to 3.5 and are introduced at from 60° F. to 120° F. over from 1 to 12 hours.

These syntans have the added advantage that they are useful in pretanning applications. They penetrate hides more rapidly and prepare the hides for better extract takeup. They also protect the grain of the leather and make possible use of more concentrated vegetable extract blends without producing case hardening. They provide rapid drum tannages when they are used as pretans. These syntans produce leather shrink, temperatures which are in the same range as those obtained with the best vegetable tanning extracts. When these syntans are used in vegetable extract blends, they stabilize the blends, provide improved bleaching of the leather, reduce sludging, disperse greases, inhibit fermentation and prevent mold growth. All of these properties are very desirable in pretanning operations. In pretanning operations, from 1% of solids to 10% of solids of the syntans based on the weight of leather in blends with from 1% of solids to 10% of solids of vegetable tannins based on the weight of leather are employed at a pH of from 5.5 to 4.0 and are introduced at from 60° F. to 100° F. over from 5 to 72 hours.

The syntans disclosed in this invention are also useful in chrome tannages of side leathers and retans on splits. When they are used in chrome tannages of side leather, i.e., as a retan on chrome, they specifically impart to the chrome leather a soft fullness, a mellow grain and a hand which is light and warm. The replacement tanning values of these syntans impart mellowness to the leather and require less fat liquor to attain the desired degree of softness. These characteristics of mellowness and softness are very desirable in glove, garment and softy type leathers. When these syntans are used as replacement syntans in chrome tannages of side leather, from 1% of solids to 20% of solids by weight of the syntans based on the weight of the leather used are normally employed at a pH of from 5.0 to 3.0 and are introduced at 75° F. to 125° F. over from ½ to 8 hours. Further, these syntans are particularly well suited for retanning chrome tannage splits for garments, suedes and casual upper leather suedes. Use of these syntans in retanning splits improves oil distribution and eliminates bony areas. When they are used as relatively light retans, they provide retanned splits having silky naps with pleasing hands. Usually when these syntans are used as retans on splits, from 0.05% of solids to 5% of solids by weight of syntan based on the weight of leather used is introduced at a pH of from 5.0 to 3.0 at from 60° F. to 120° F. over from ½ to 5 hours.

Thus it is clear that the products of the present invention are truly unique in that they are outstanding universal tanning agents which bring about the production of outstanding leather.

For a fuller understanding of the nature and objects of this invention, reference may be made to the following examples which are given merely to illustrate the invention and are not to be construed in a limiting sense.

Example I (A) *Preparation of resin.*—197.5 g. (2.02 moles) of a hydroxy aromatic component which was a mixture containing 1.5 moles of phenol, 0.5 mole of cresols and 0.02 mole of xylenols was charged to a flask. The mole ratio of phenol to cresol in this mixture was 3:1. The mole ratio of cresol isomers in this mixture was ortho:meta: para=5.5:2.5:1 and the mole ratio of xylenol isomers in this mixture was 2,4-:2,5-:2,6-=1:1:3. 1.0 g. (0.01 mole) of sulfuric acid 98% was added as a catalyst to the mixture. Then 39 g. (1.3 moles of formaldehyde 100%) in the form of 42.9 g. of paraformaldehyde 91% active was added to the hydroxy aromatic component-sulfuric acid mixture in eight equal portions. The first addition of paraformaldehyde was made at 30° to 35° C. The temperature rose from 35° to 50° to 55° C. within a few minutes. The second addition of paraformaldehyde was made and the temperature rose to 70 to 75° C. The temperature rose to 90° to 95° C. shortly after the third addition. The reaction mixture was cooled to 70° C. and the fourth addition of paraformaldehyde was made. The temperature rose to 95° C., the mixture was cooled to 70° C. and the fifth addition of paraformaldehyde was made. The temperature again rose to 95° C. and the reaction mixture was cooled to 70° C. This procedure was repeated until all eight paraformaldehyde additions were completed. The paraformaldehyde additions required one and one-half hours. After the paraformaldehyde additions were completed, the reaction mixture was heated to gentle reflux (100° to 105° C.) and refluxed for one hour. After reaction was completed, a low vacuum (6 to 8 inches) was applied to the reaction mixture and the vacuum was gradually increased while the temperature was maintained at 100° C. until a full vacuum (28 to 29 inches) was obtained. The resin was dried until its water content was 2.0% by weight.

(B) *Sulfonation of the resin.*—The resin obtained in part (A) above was cooled to 80° C. and 40.8 g. (0.4 mole) of acetic anhydride was added in four equal portions. The mixture was agitated to obtain a uniform composition and cooled to 75° C. A total of 92 g. (0.92 mole) of sulfuric acid 98% was added dropwise over one and one-half hours at 75° to 80° C. to sulfonate the resin. After sulfuric acid addition was complete, the reaction mixture was stirred for one and one-half hours at 75° to 80° C. to obtain the sulfonated resin. The ratio of sulfonic groups per mole of hydroxy aromatic component was 0.455 to 1.

(C) *Condensation of the sulfonated resin.*—144 g. (8 moles) of water was added to the sulfonated resin obtained in part (B) above while the resin was cooled so that the temperature did not exceed 70° C. After water addition was complete, the reaction mixture was agitated to assure uniformity and 50 g. (0.53 mole) of phenol was added. The resulting mixture was cooled to 35° to 40° C. 55 g. of a formaldehyde methanol mixture containing 9.6 g. (0.32 mole of formaldehyde 100%) in the form of an 18% water solution and 2 g. of methanol was added to the reaction mixture. 50 g. of the formaldehyde methanol mixture was added slowly over one and one-half hours while the temperature was maintained at 40° to 45° C. The remaining 5 g. of the formaldehyde methanol mixture was added and the mixture reacted for an additional hour at 40° to 45° C. The resulting condensation product was neutralized at 50° C. by slowly adding 143 g. of 30% by weight sodium hydroxide solution. The final product contained 50% solids and a 10% solution had a pH of 3.0. The ratio of tannins to total solids was 61.0.

Example II (A) *Preparation of resin.*—400 g. (4.06 moles) of a hydroxy aromatic component which was a mixture containing 2.8 moles of phenol, 1.2 moles of cresols, 0.03 mole of xylenols and 0.03 mole of o-ethyl phenol was charged to a flask. The mole ratio of phenol to cresol in this mixture was 2.33:1. The mole ratio of cresol isomers in this mixture was ortho:meta:para=4.5:2.4:1. The mole ratio of xylenol isomers in this mixture was 2,4-:2,5-:2,6-=1:1:3. 2.0 g. (0.02 mole) of sulfuric acid 98% was added as a catalyst to the mixture. Then 78 g. (2.6 moles of formaldehyde 100%) in the form of 85.8 g. of paraformaldehyde 91% active was added to the hydroxy aromatic component-sulfuric acid mixture in eight equal portions. The first addition of paraformaldehyde was made at 25° C. The temperature rose from 25° to 45° C. within 10 minutes. The second addition of paraformaldehyde was made and the temperature rose from 45° to 65° C. The temperature rose from 65° to 85° C. shortly after the third addition. The reaction mixture was cooled to 70 C. and the fourth addition of paraformaldehyde was made. The temperature rose to 95° C.; the mixture was cooled to 70° C., and the fifth addition of paraformaldehyde was made. The temperature again rose to 95° C. and the reaction mixture was cooled to 70° C. This procedure was repeated until all eight paraformaldehyde additions were completed. The paraformaldehyde additions required a total of one and one-half hours. After the paraformaldehyde additions were completed, the reaction mixture was heated to gentle reflux (100° to 105° C.) and refluxed for one hour. After reflux was completed, a low vacuum (6 to 8 inches) was applied to the reaction mixture and the vacuum was gradually increased while the temperature was maintained at 100° C. until a full vacuum (29 inches) was obtained. The resin was dried until its water content was 1.5% by weight.

(B) *Sulfonation of the resin.*—The resin obtained in part (A) above was cooled to 80° C. and 102 g. (1.0 mole) of acetic anhydride was added in four equal portions. The mixture was agitated to obtain a uniform composition and cooled to 75° C. A total of 184 g. (1.84 moles) of sulfuric acid 98% was added dropwise over one and one-half hours at 75° to 80° C. to sulfonate the resin. After sulfuric acid addition was complete, the reaction mixture was stirred for one and one-half hours at 80° C. to obtain the sulfonated resin. The ratio of sulfonic groups per mole of hydroxy aromatic component was 0.453 to 1.

(C) *Condensation of the sulfonated resin.*—288 g. (16 moles) of water was added to the sulfonated resin obtained in part (B) above while the resin was cooled so that the temperature did not exceed 70° C. After water addition was complete, the reaction mixture was agitated to assure uniformity and 110 g. (1.16 moles) of phenol was added. The resulting mixture was cooled to 35° to 40° C. 110 g. of a formaldehyde methanol mixture containing 19.5 g. (0.65 mole of formaldehyde 100%) in the form of an 18% water solution and 4 g. of methanol mixture was added. 80 g. of the formaldehyde methanol mixture was added slowly over one and one-half hours while the temperature was maintained at 40° to 45° C. The remaining 30 g. of the formaldehyde methanol mixture was added and the mixture reacted for an additional hour at 40° to 45° C. The resulting condensation product was neutralized at 50° C. by slowly adding 290 g. of 30% by weight sodium hydroxide solution. A 10% solution had a pH of 3.0.

Example III (A) *Preparation of resin.*—404 g. (4.1 moles) of a hydroxy aromatic component which was a mixture containing 2.84 moles of phenol, 1.2 moles of cresols and 0.06 mole of xylenols was charged to a flask. The mole ratio of phenol to cresol in this mixture was 2.37:1. The molecular ratio of cresol isomers in this mixture was ortho:meta:para=5:2.5:1. The mole ratio of xylenol isomers in this mixture was 2,4-:2,5-:2,6-=1:1:3. 3.0 g. (0.03 mole) of sulfuric acid 98% was added as a catalyst to the mixture. Then 500 g. water was added and 212 g. (2.6 moles) of formaldehyde 37% active was added at 25° C. to the hydroxy aromatic component-sulfuric acid mixture. The formaldehyde addition required 10 minutes. After the formaldehyde addition was completed, the reaction mixture was heated to 80° C., heat was discontinued and the temperature of the mixture rose to 100° C. without external heating. The mixture was refluxed for four more hours. The stirring was stopped and the reaction mixture was left for phase separation overnight. Two layers were formed. The upper layer which was the water layer was removed by siphoning. The resin was vacuum dried until its water content was 1.5% by weight.

(B) *Sulfonation of the resin.*—The resin obtained in part (A) above was cooled to 80° C. and 81.6 g. (0.8 mole) of acetic anhydride was added in four equal portions. The mixture was agitated to obtain a uniform composition and cooled to 75° C. A total of 184 g. (1.84 moles) of sulfuric acid 98% was added dropwise over one and one-half hours at 75° to 80° C. to sulfonate the resin. After sulfuric acid addition was complete, the reaction mixture was stirred for one and one-half hours at 75° to 80° C. to obtain the sulfonated resin. The ratio of sulfonic groups per mole of hydroxy component was 0.45 to 1.

(C) *Condensation of the sulfonated resin.*—288 g. (16 moles) of water was added to the sulfonated resin obtained in part (B) above while the resin was cooled so that the temperature did not exceed 70° C. After water addition was complete, the reaction mixture was agitated to assure uniformity and 100 g. (1.06 moles) of phenol was added. The resulting mixture was cooled to 35° C. 110 g. of a formaldehyde methanol mixture containing 19.2 g. (0.64 mole of formaldehyde 100%) in the form of an 18% water solution and 4 g. of methanol mixture was added. 90 g. of the formaldehyde methanol mixture was added over one and one-half hours while the temperature was maintained at 40° to 45° C. The remaining 20 g. of the formaldehyde methanol mixture was added and the mixture reacted for an additional hour at 40° to 45° C. The resulting condensation product was neutralized at 45° C. by slowly adding 266 g. of sodium hydroxide in the form of a 30% by weight solution. A 10% solution had a pH of 3.0.

Example IV (A) *Preparation of resin.*—193.6 g. (2 moles) of a hydroxy aromatic component which was a mixture containing 1.6 moles of phenol, 0.24 mole of ortho-cresol, 0.1 mole of meta-creson, 0.04 mole of para-cresol, 0.02 mole of 3,5-xylenol was charged to a flask. The mole ratio of phenol to cresol in this mixture was 4.2:1. The mole ratio of cresol isomers in this mixture was ortho:meta:para=6:2.5:1

1.0 g. (0.01 mole) of sulfuric acid 98% was added as a catalyst to the mixture. Then 60 g. of 90% paraformaldehyde was added to the hydroxy aromatic component-sulfuric acid mixture in ten equal portions. These additions were made under the conditions described in Example I(A). After the additions were complete, the reaction mixture was heated to gentle reflux and refluxed for one hour. The resulting resin was vacuum dried at 100° C.

(B) *Sulfonation of the resin.*— The resin obtained in part (A) above was cooled to 85° C. and 52 g. of acetic anhydride was added in four equal portions. The mixture was agitated to obtain a uniform composition and cooled to 75° C. A total of 140 g. of sulfuric acid 98% was added dropwise over two and one-half hours at 75° to 80° C. to sulfonate the resin. After the sulfuric acid addition was complete, the reaction mixture was stirred for one hour at 75° to 80° C. to obtain the sulfonated resin. The ratio of sulfonic groups per mole of hydroxy aromatic component was 0.7:1.

(C) *Condensation of the sulfonated resin.*—144 g. of water was added to the sulfonated resin obtained in part (B) above while the resin was cooled so that the temperature did not exceed 70° C. 18.8 g. (0.2 mole) of phenol was added. The resulting mixture was cooled to 35° C. and 40 g. of a formaldehyde mixture containing 6 g. (0.2 mole) formaldehyde 100% was very slowly added to the reaction mixture over a period of one-half hour while the temperature was maintained at 40° C. After the addition was completed the mixture was reacted for an additional hour at 40° to 45° C. The resulting condensation product was neutralized at 50° C. by slowly adding 210 g. of 30% by weight sodium hydroxide solution. A 10% solution had a pH of 2.3.

Example V (A) *Preparation of resin.*—202.7 g. (2 moles) of a hydroxy aromatic component which was a mixture containing one mole of phenol and 0.95 mole of cresols and 0.05 mole of xylenols was charged to a flask. The mole ratio of phenol to cresol in this phenol mixture was 1.05:1. The mole ratio of cresol isomers in this mixture was ortho:meta:para=7:1.5:1. The mole ratio of xylenol-isomers in this mixture 2,4-:2,6-=1:2. 1.5 g. (0.015 mole) of sulfuric acid 98% was added as a catalyst to the mixture. 39 g. (1.3 moles) of formaldehyde 100% in the form of 42.9 g. of paraformaldehyde 91% active was added to the hydroxy aromatic component-sulfuric acid mixture in eight equal portions. These additions were made under the conditions described in Example I (A). After the paraformaldehyde additions were completed, the reaction mixture was refluxed for one hour and the resulting resin was vacuum dried at 100° C.

(B) *Sulfonation of the resin.*—The resin obtained in part (A) above was cooled to 80° C. and 1.6 g. of acetic anhydride was added in four equal portions. The mixture was cooled 75° C. A total of 94 g. (one mole) of oleum 20% was added dropwise over one and one-half hours at 75° C. to sulfonate the resin. After the oleum addition was complete, the reaction mixture was stirred for one and one-half hours at 75° to 80° C., to obtain the sulfonated resin. The ratio of sulfonic groups per mole of hydroxy aromatic component was 0.5:1.

(C) *Condensation of the sulfonated resin.*—150 g. of water was added to the sulfonated resin obtained in part (B) above while the resin was cooled so that the temperature did not exceed 70° C. After water addition was complete, the reaction mixture was agitated to assure uniformity and 47 g. (0.5 mole) of phenol was added. The resulting mixture was cooled to 35° C. 24.5 g. of 37% formaldehyde (0.3 mole) and 30 g. water were mixed together and added slowly to the reaction mixture. The resulting condensation product was neutralized at 50° C. by slowly adding 155 g. of 30% by weight of sodium hydroxide solution. A 10% solution had a pH of 2.8.

Example VI (A) *Preparation of resin.*—395.6 g. (4 moles) of a hydroxy aromatic component which was a mixture containing 2.8 moles of phenol and 1.0 mole of cresols and 0.2 mole of xylenols was charged to a flask. The mole ratio of phenol to cresol was 2.8:1. The mole ratio of cresol isomers in this mixture was ortho:meta:para=1:3:1

The mole ratio of xylenol isomers in this mixture was 2,4-:2,6-=1:3. 2.0 g. (0.02 mole) of sulfuric acid 98% was added as a catalyst to the mixture. Then 80 g. (2.4 moles) of paraformaldehyde 90% was added to the hydroxy aromatic component-sulfuric acid mixture in eight equal portions. These additions were made under the conditions described in Example I(A). After the paraformaldehyde additions were completed, the reaction mixture was refluxed for one hour and the resulting resin was vacuum dried at 100° C.

(B) *Sulfonation of the resin.*—The resin obtained in part (A) above was cooled to 80° C. and 102 g. of acetic anhydride was added in four equal portions. The mixture was cooled to 85° C. and a total of 140 g. (1.4 moles) of sulfuric acid 98% was added dropwise over two hours at 85° C. to sulfonate the resin. After sulfuric acid addition was complete, the reaction mixture was stirred for an additional six hours at 85° C. to obtain the sulfonated resin. The ratio of sulfonic groups per mole of hydroxy aromatic component was 0.35:1.

(C) *Condensation of the sulfonated resin.*—300 g. of water was added to the sulfonated resin obtained in part (B) above while the resin was cooled so that the temperature did not exceed 70° C. After the water addition was complete, 188 g. (2 moles) of phenol was added and the resulting mixture was cooled to 40° C. 130 g. of 3% formaldehyde (1.6 moles) solution diluted with 130 g. of water was added slowly to the cooled mixture. After the addition was completed, the product was neutralized at 50° C. by slowly adding 230 g. of a 30% by weight sodium hydroxide solution. A 10% solution had a pH of 2.5.

Example VII (A) *Preparation of resin.*—395.6 g. (4 moles) of a hydroxy aromatic component which was a mixture containing 2.6 moles of phenol and 1.4 moles of cresols was charged to a flask. The mole ratio of phenol to cresol was 1.85:1. The mole ratio of cresol isomers in the mixture was ortho:meta:para=6:0:1. 2.0 g. (0.02 mole) of sulfuric acid 98% was added as a catalyst to the mixture. 93.4 g. of paraformaldehyde 90% (2.8 moles) was added to the hydroxy aromatic component-sulfuric acid mixture in eight equal portions. These additions were made under the conditions described in Example I(A). After the paraformaldehyde additions were completed, the reaction mixture was refluxed for one hour and the resulting resin was vacuum dried at 100° C.

(B) *Sulfonation of the resin.*—The resin obtained in part (A) above was cooled to 80° C. and 100 g. of acetic anhydride was added in four equal portions. The mixture was cooled to 75° C. A total of 196 g. (2 moles) of sulfuric acid 100% was added dropwise over one and one-half hours at 75° to 80° C. to sulfonate the resin. After sulfuric acid addition was complete, the reaction mixture was stirred for two hours at 80° C. The ratio of sulfonic groups per mole of hydroxy aromatic component was 0.5:1.

(C) *Condensation of the sulfonated resin.*—300 g. of water was added to the sulfonated resin obtained in part (B) above while the resin was cooled so that the temperature did not exceed 70° C. After water addition was complete, the reaction mixture was agitated to assure uniformity and 150 g. (1.6 moles) of phenol was added. The resulting mixture was cooled to 35° C. 97 g. of formaldehyde 37% (1.2 moles) solution diluted with 100 g. water was added slowly to the reaction mixture. The temperature during the addition was maintained at 40° to 45° C. After the addition was completed, the mixture was stirred for an additional hour at 50° C. The resulting condensation product was neutralized at 50° C. by slowly adding 300 g. of a 30% by weight sodium hydroxide solution. A 10% solution had a pH of 2.8.

Example VIII

Example I was repeated with the exception that the 50 g. of phenol used in Part (C) were replaced with 52 g. of the same hydroxy aromatic component which was used in part (A).

Example IX

This example demonstrates the bleaching characteristics of the synthetic tanning agents of this invention when they are used in conjunction with a blend of vegetable extracts.

250 g. of drained pickled upholstery grain stock, gauging 2½ to 3 ozs. and possessing a pH of 2.0 was depickled to a pH of 5.2 with 10 g. of sodium formate and 4.4 g. of sodium carbonate in 250 cc. of a 5% salt solution. After an equilibrium was established, stock was washed free of all salts and drained.

250 cc. of water was added to the drained stock to provide float at 75° F. The following tanning blend was made up: 25 g. of synthetic tanning agent of Example I which contained 50% solids, 150 g. of a vegetable extract blend containing 31% solids, density 130 Bk. containing 65% of 4% bisulfited quebracho, 25% wattle and 10% chestnut and 100 g. water. The mixture contained 46.5 g. vegetable extract solids and 12.5 g. syntan solids for a total of 59 g. solids which amounts to 23.6% of tanning agents on the weight of the pickled stock. The mixture was divided in three equal parts and added to the stock in three feeds, one-half hour apart and run for twenty hours thereafter. The pH of the system at this point was 4.8 and the shrink temperature of the stock was 80% C. The liquor was well exhausted.

The stock was then drained free of exhausted tanning liquor and was given 125 cc. of water and 4 g. of oxalic acid and run one hour. After this time, the pH of the liquor was 3.2. The stock was then drained and floated for twelve minutes with 1250 cc. of water at 120° F. and washed for twelve minutes and then redrained for the fat liquor operation.

A fat liquor containing 12.5 g. of a mixture of sulfated animal and vegetable oils dissolved in 250 cc. of water at 120° F. was applied and the stock was run for sixty minutes. The takeup of the fat liquor was complete. The stock was drained, tacked out to dry and then evaluated for results. The leather resulting from the above example was very light in color, with a level shade, with no undertones, was soft, full and pliable. It had a tight grain and had superior physical characteristics like high stitch strength and high tensile strength. The tensile strength of leather was 2,630 lbs. per square inch; the stitch strength was 740 lbs. per square inch.

Example X

The procedure of Example IX was repeated with the exception that the synthetic tanning agent obtained in Example II was employed.

Example XI

This example demonstrates the use of the synthetic tanning agents of this invention as single tanning agents.

300 g. of drained pickled stock gauging 3 ozs. and having a pH of 2.0 was floated in 300 cc. of a 4% salt solution for thirty minutes to rewet and soften the stock. 150 g. of the synthetic tanning agents of Example I which contained 50% solids and 150 cc. of water were blended together and the resulting solution divided into three equal parts. These parts were added to the stock in three feeds, one-half hour apart and were run for twenty hours thereafter. The pH of the system was 2.7 and the shrink temperature 78° C., the liquor being well exhausted and free of any color or cloudiness.

The stock was washed with 1500 cc. of water at 120° F. for twelve minutes and drained. A non-fat sample was removed and dried for comparison with fully processed leather.

After draining, 15 g. of a sulfated oil dissolved in 300 cc. of water at 120° F. was added as a fat liquor and run for one hour. The stock was drained, tacked out to dry and then evaluated. The leather resulting from this process was of a very light color with a pinkish shade. It was very plump, soft and strong. It had a tight and smooth grain.

Example XII

The procedure of Example XI was repeated with the exception that the synthetic tanning agent obtained in Example II was employed.

Example XIII

This example demonstrates the use of the tanning agents of this invention as retanning agents on chrome pretanned stock.

200 g. of wrung, split, shaved chrome stock having a pH of 3.9 and having a shrink temperature of 100° C. was washed for 30 minutes in 1000 cc. water at 120° F. The water was drained completely. 20 g. of a synthetic tanning agent of Example I which contained 50% solids were dissolved in 200 cc. of water at 128° F., added to the stock and run for sixty minutes. The exhausted liquor had a pH of 3.5. The drained stock was washed in 1000 cc. of water at 125° F. for ten minutes and drained. 12 g. of a sulfated oil dissolved in 200 cc. of water at 125° F. were added as a fat liquor and run for one hour. Fat liquor takeup was complete and the pH of the exhausted liquor was 3.7. The stock was drained and tacked to dry. The leather treated in the above manner was much more pliable and was fuller than the straight chrome tanned stock. It had a light and warm handle.

Example XIV

The procedure of Example XIII was repeated with the exception that the synthetic tanning agent obtained in Example II was employed.

Example XV

This example demonstrates the use of the synthetic tanning agents of this invention in a laboratory rocker system to simulate the actual yard process. Eighteen rockers containing the following vegetable extract blend: 65% bisulfated quebracho, 25% wattle, 10% chestnut. To this vegetable blend were added 10% of the synthetic tanning agent of Example I which contained 50% solids. The percentage was based on the solids content of the syntan and the vegetable blend. The strengths of the first rocker was 0.5 Bé. going gradually up to 8 Bé. in the eighteenth rocker. Pieces of a delimed cowhide were suspended in the first rocker, left for twenty-four hours and moved the next day to the second rocker, left again for twenty-four hours and this was repeated daily until the eighteenth rocker was reached. The hide pieces were left in the eighteenth rocker for two days. Then additional amounts of the vegetable blend and syntan were used in the process and the pieces were finished according to standard process for sole leather and then evaluated. The resulting leather had an unusual brightness, very clear color and a strong, tight and fine grain. The tan penetration was even, the liquors in the rockers did not show any traces of sedimentation or fermentation.

Example XVI

The procedure of Example XV was repeated with the exception that the synthetic tanning agent obtained in Example II was employed.

The following two examples illustrate the criticality of the combination of the components of the syntans and their proportions. As will be seen, when operating outside of the limits of the invention, the outstanding results of this invention are not achieved.

Example XVII (A) *Preparation of resin.*—188 g. (2 moles) phenol was charged to a flask 1 g. (0.01 mole) of sulfuric acid 98% was added as a catalyst to the phenol mixture. Then 225 g. water and (1 mole) 81 g. of formaldehyde 37% was added to the phenol-sulfuric acid water mixture at 25° C. The mixture was heated to 80° C. and heat was discontinued. The temperature rose without external heating to the boiling point of the mixture (100° C.). The reflux was continued for four hours more. The reaction mass was left for separation overnight. Next day the upper water layer was removed and the resin which was on the bottom layer was vacuum dried to 1.5% moisture content.

(B) *Sulfonation of the resin.*—The resin obtained in part (A) above was cooled to 75° C. 98 g. (1 mole) of sulfuric acid 100% was added dropwise over one and one-half hours at 75° to 80° C. to sulfonate the resin. After sulfuric acid addition was complete, the reaction mixture was stirred for two hours at 80° to obtain the sulfonated resin. The ratio of sulfonic groups per phenolic ring was 0.5 to 1.

(C) *Condensation of the sulfonated resin.*—144 g. (8 moles) of water was added to the sulfonated resin obtained in part (B) above while the resin was cooled so that the temperature did not exceed 70° C. After water addition was complete, the reaction mixture was agitated to assure uniformity. The resulting mixture was cooled to 45° C. 27.5 g. of a formaldehyde methanol mixture containing 4.8 g. (0.16 mole of formaldethyde 100%) in the form of an 18% water solution and 1 g. of methanol mixture was added slowly over one hour while the temperature was maintained at 40° to 45° C. The resulting condensation product was neutralized at 50° C. by slowly adding 140 g. of 30% by weight sodium hydroxide solution.

(D The tanning agent obtained in part (C) above was evaluated as a bleaching agent in conjunction with the blend of vegetable extracts used in Example IX and following the procedure in Example IX. The resulting leather was examined and found to be discolored, with unlevel shades. The color was an uneven reddish-brown. It did not have a tight grain and the feel of the leather was harsh.

(E) The tanning agent obtained in part (C) above was evaluated as a single tanning agent by the procedure given in Example XI. The resulting leather was very poor in color, was not uniform, had a slightly loose grain and the feel was not satisfactory.

Example XVIII (A) *Preparation of resin.*—202 g. of phenol mixture (2.0 moles) containing one mole of phenol and one mole of cresol was charged to a flask. The molecular ratio of phenol to cresol in this phenol mixture was 1:1. The molecular ratio of cresol isomers in this mixture was ortho:meta:para=1.5:2.5:1. 1 g. (0.01 mole) of sulfuric acid 98% was added as a catalyst to the phenol mixture. Then 225 g. of water and 81 g. formaldehyde 37% (1 mole) was added to the hydroxy aromatic component-sulfuric acid water mixture at 25° C. The mixture was heated to 80° C. and heat was discontinued. The temperature rose without external heating to the boiling point of the mixture (100° C.). The reflux was continued for four hours more. The reaction mixture was left for separation overnight. Next day the upper water layer was removed and the resin was vacuum dride to 1.5% moisture content.

(B) *Sulfonation of the resin.*—The resin obtained in part (A) above was cooled to 75° C. 98 g. (1 mole) of sulfuric acid 100% was added dropwise over one and one-half hours at 75° to 80° C. to sulfonate the resin. After sulfuric acid addition was complete, the reaction mixture was stirred for two hours at 80° C. to obtain the sulfonated resin. The ratio of sulfonic groups for mole of hydroxy aromatic components was 0.5:1.

(C) *Condensation of the sulfonated resin.*—150 g. of water was added to the sulfonated resin obtained in part (B) above while the resin was cooled so that the temperature did not exceed 70° C. After water addition was complete, the reaction mixture was agitated to assure uniformity. The resulting mixture was cooled to 45° C. and 35 g. of formaldehyde mixture containing 6 g. of formaldehyde 100% was added slowly over one hour while the temperature was maintained at 40° to 45° C. The resulting condensation product was neutralized at 50° C. by adding 140 g. of 30% by weight sodium hydroxide solution.

(D) The syntan obtained in part (C) above was evaluated as a bleaching agent in the vegetable extract blends used in Example IX and following the procedure in Example IX. The leather resulting from the test was evaluated and found to be of a violet-brown shade with many undertones and had a dry feel.

(E) The tanning agent obtained in part (C) above was evaluated as a single tanning agent by the procedure given in Example XI. The resulting leather was strongly discolored and had a harsh feel.

What is claimed is:

1. In processes for pretanning, tanning and retanning of leather, the step comprising introducing from about 0.05% to about 50% of solids, based on the weight of said leather, of a synthetic anionic tanning agent comprising the condensate of
 (I) the reaction product of
  (A) one mole of a hydroxy aromatic component consisting essentially of per each mole thereof
   (1) from about 0.5 to 0.8 mole of phenol,
   (2) from about 0 to 0.25 mole of at least one substituted phenol having reactive hydrogen atoms in each of the 2-, 4- and 6- positions of the aromatic ring, said substituted phenol being selected from the group consisting of the methylphenols, ethylphenols, dimethylphenols, and diethylphenols,
(3) from about 0.1 to 0.4 mole of at least one member of the group consisting of substituted phenols having reactive hydrogen atoms in both the 4- and 6- positions of the aromtic ring and substituted phenols having reactive hydrogen atoms in both the 2- and 6-positions of the aromatic ring, said substituted phenol being selected from the group consisting of the methylphenols, ethylphenols, dimethylphenols and diethylphenols, and
(4) from about 0.0 to 0.05 mole of at least one member of the group consisting of substituted phenols having a reactive hydrogen atom in the 4- position of the aromatic ring as the sole reactive hydrogen atom and substituted phenols having a reactive hydrogen atom in the 6- position of the aromatic ring as the sole reactive hydrogen atom, said substituted phenol being selected from the group consisting of the dimethylphenols and diethylphenols, and
(B) from about 0.6 to 0.9 mole of formaldehyde per mole of said hydroxy aromatic component, said condensate of (A) and (B) thereafter sulfonated to contain from 0.35 to 0.7 mole of $SO_3$ per mole of said hydroxy aromatic component,
(II) from 0.1 to 0.5 mole per mole of said hydroxy aromatic component of at least one member of the group consisting of phenol and a hydroxy aromatic component as defined in I (A) above, and
(III) from about 0.1 to 0.4 mole per mole of said hydroxy aromatic component of formaldehyde.

2. In processes for pretanning, tanning and retanning of leather, the improvement comprising introducing from about 0.1% to 100% of solids, based on the weight of said leather, of vegetable tannins, and about 0.05% to about 50% of solids, based on the weight of said leather, of a synthetic anionic tanning agent comprising the condensate of
(I) the reaction product of
(A) one mole of a hydroxy aromatic component consisting essentially of per each mole thereof
(1) from about 0.5 to 0.8 mole of phenol,
(2) from about 0 to 0.15 mole of at least one substituted phenol having reactive hydrogen atoms in each of the 2-, 4- and 6- positions of the aromatic ring, said substituted phenol being selected from the group consisting of the methylphenols, ethylphenols, dimethylphenols, and diethylphenols,
(3) from about 0.1 to 0.4 mole of at least one member of the group consisting of substituted phenols having reactive hydrogen atoms in both the 4- and 6- positions of the aromatic ring and substituted phenols having reactive hydrogen atoms in both the 2- and 6- positions of the aromatic ring, said substituted phenol being selected from the group consisting of the methylphenols, ethylphenols, dimethylphenols and diethylphenols, and
(4) from about 0.0 to 0.05 mole of at least one member of the group consisting of substituted phenols having a reactive hydrogen atom in the 4- position of the aromatic ring as the sole reactive hydrogen atom and substituted phenols having a reactive hydrogen atom in the 6- position of the aromatic ring as the sole reactive hydrogen atom, said substituted phenols being selected from the group consisting of the dimethylphenols and diethylphenols, and
(B) from about 0.6 to 0.9 mole of formaldehyde per mole of said hydroxy aromatic component, said condensate of (A) and (B) thereafter sulfonated to contain from 0.35 to 0.7 mole of $SO_3$ per mole of said hydroxy aromatic component,
(II) from 0.1 to 0.5 mole per mole of said hydroxy aromatic component of at least one member of the groups consisting of phenol and a hydroxy aromatic component as defined in I (A) above, and
(III) from about 0.1 to 0.4 mole per mole of said hydroxy aromatic component of formaldehyde.

3. Leather treated with a synthetic anionic tanning agent comprising the condensate of
(I) the reaction product of
(A) one mole of a hydroxy aromatic component consisting essentially of per each mole thereof
(1) from about 0.5 to 0.8 mole of phenol,
(2) from about 0 to 0.15 mole of at least one substituted phenol having reactive hydrogen atoms in each of the 2-, 4- and 6- positions of the aromatic ring, said substituted phenol being selected from the group consisting of the methylphenols, ethyl phenols, dimethylphenols, and diethylphenols,
(3) from about 0.1 to 0.4 mole of at least one member of the group consisting of substituted phenols having reactive hydrogen atoms in both the 4- and 6- positions of the aromatic ring and substituted phenols having reactive hydrogen atoms in both the 2- and 6- positions of the aromatic ring, said substituted phenol being selected from the group consisting of the methylphenols, ethylphenols, dimethylphenols and diethylphenols, and
(4) from about 0.0 to 0.05 mole of at least one member of the group consisting of substituted phenols having a reactive hydrogen atom in the 4- position of the aromatic ring as the sole reactive hydrogen atom and substituted phenols having a reactive hydrogen atom in the 6- position of the aromatic ring as the sole reactive hydrogen atom, said substituted phenols being seletced from the group consisting of the dimethylphenols and diethylphenols, and
(B) from about 0.6 to 0.9 mole of formaldehyde per mole of said hydroxy aromatic component, said condensate of (A) and (B) thereafter sulfonated to contain from 0.35 to 0.7 mole of $SO_3$ per mole of said hydroxy aromatic component,
(II) from 0.1 to 0.5 mole per mole of said hydroxy aromatic component of at least one member of the group consisting of phenol and a hydroxy aromatic component as defined in I (A) above, and
(III) from about 0.1 to 0.4 mole per mole of said hydroxy aromatic component of formaldehyde.

No references cited.

GEORGE F. LESMES, Primary Examiner
JOHN R. MILLER, Assistant Examiner

U.S. Cl. X.R.
8—94.21, 94.26, 94.32, 94.33

PO-1050
(5/69)

UNITED STATES PATENT OFFICE
CERTIFICATE OF CORRECTION

Patent No. 3,480,379      Dated November 25, 1969

Inventor(s) Stanley A. Lipowski and James M. Kelly

It is certified that error appears in the above-identified patent and that said Letters Patent are hereby corrected as shown below:

Column 1, line 5, change "Diamond Alkali Company" to --Diamond Shamrock Corporation--.

SIGNED AND
SEALED

MAR 3 - 1970

(SEAL)
Attest:

Edward M. Fletcher, Jr.
Attesting Officer

WILLIAM E. SCHUYLER, JR.
Commissioner of Patents